Feb. 23, 1932.  A. J. GIBSON  1,846,857
SCREW DRIVER
Filed April 6, 1931

A. J. Gibson
INVENTOR

BY Victor J. Evans
and Co.
ATTORNEYS

Patented Feb. 23, 1932

1,846,857

UNITED STATES PATENT OFFICE

ARCHIE J. GIBSON, OF CHICAGO, ILLINOIS

SCREW DRIVER

Application filed April 6, 1931. Serial No. 528,205.

My present invention has reference to a screw driver, the object of the invention being the provision of a screw driver provided with a bit of such nature and construction as to frictionally engage in the kerfed head of a screw to contact with the walls thereof, so that the screw will be held by the bit.

A further object is to arrange on the end of the shank of the screw driver a bit in the nature of two spring members which normally swing away from each other, to arrange over the members comprising the bit an eye attached to one end of a slide which is guided along the shank of the screw driver and which slide has a ring head that surrounds the shank and which may be readily gripped by the user for longitudinally moving the slide to cause the eye to travel over the bit sections to force the same toward each other, as when the bit is to be inserted in the kerfed head of a screw and moved in an opposite direction to permit of the bit sections springing away from each other, to frictionally contact with the opposite walls provided by the kerf in the screw and thereby effectively holding the screw on the bit or permitting the removal of the bit from the screw.

To the attainment of the foregoing and other objects which will present themselves as the nature of the invention is better understood the invention consists in the improvement hereinafter described and definitely claimed.

Figure 1:
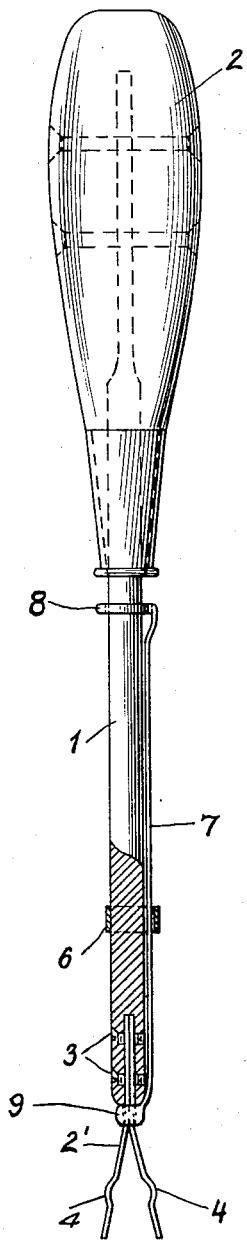
Figure 1 is a side elevation of the improvement with parts in section.

The shank 1 of the screw driver is preferably round in cross section and has one of its ends let in and secured to the handle 2. The opposite end of the shank is slotted, and there is received in the slot the inner ends of the flat spring members 2', respectively, that comprise the bit. The bit sections are secured in the slot or opening of the shank by screws or like elements 3, and the bit members, adjacent to their outer ends, are bowed, as at 4. Also the outer or active ends of the bit sections preferably have their outer faces slightly widened and roughened, as at 5.

Fixed on the shank 1 there is a guide ring 6 through which is movable a bar in the nature of a slide 7. The slide has one of its ends formed with a ring head 8 that is arranged around the shank 1 and its second or outer end is rounded toward the end of the shank and formed with an eye 9 that receives therethrough the bit sections 2.

Figure 2:
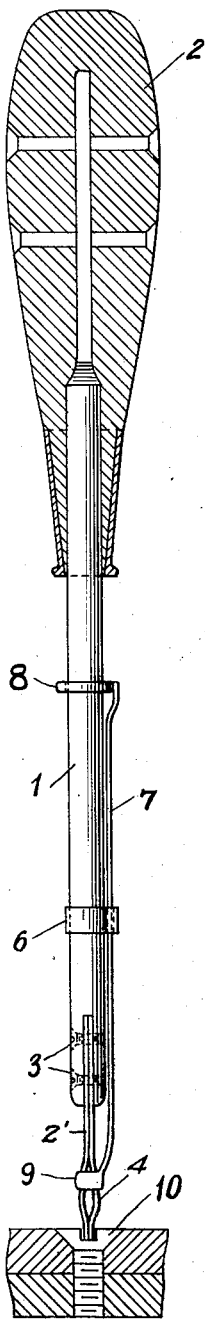
Figure 2 is a similar view showing the screw driver having its bit received in the kerfed head of a screw, the handle of the screw driver being in section.
Figure 3:
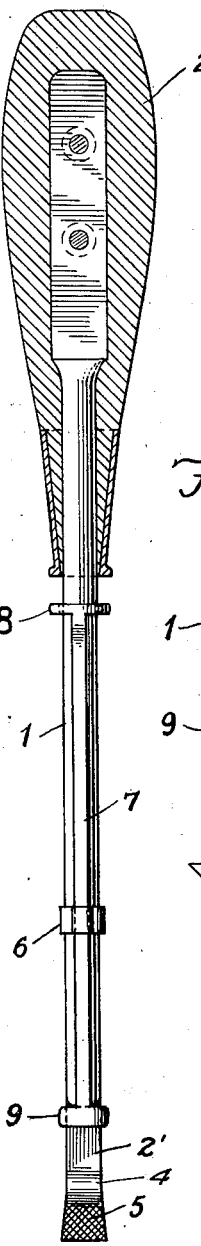
Figure 3 is a view looking at right angles to the showing in Figure 2.
Figure 4:
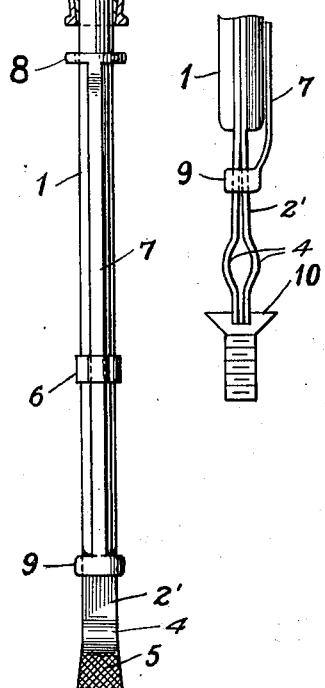
Figure 4 is a detail view to illustrate the slide moved to permit of the spring bit sections spreading away from each other.

The bit sections, as stated, normally spring away from each other and in order to bring the said sections together the slide is moved to the position disclosed by Figure 2 of the drawings. This permits of the bit being inserted in the kerf in the head of a screw 10. The ring head 8 of the slide is operated to move the eye 9 toward the shank which permits the bit sections to spring away from each other and to frictional contact with the opposite walls provided by the kerf in the screw head, thereby effectively holding the screw on the bit. The bowed portions 4 limit the movement of the eye 9 outwardly with respect to the bit and the inward movement of the slide is limited by the contact of the eye 9 with the outer end of the shank 1.

It is thought that the foregoing description will fully and clearly set forth the advantages of the construction so that further detailed description will not be required.

Having described the invention, I claim:

A screw driver comprising a shank, a handle fixed to the shank, said shank being provided at its end with a recess, spring members having end portions received in said recess and provided beyond the end of the shank with bowed portions and having roughened surfaces below said bowed portions, the portions having said roughened portions being widened toward the ends of said spring members forming acuminate points, a guide ring fitting upon the shank, a slide member passing through said ring and provided at its upper end with a head which slidably receives the shank and at its lower end with an eye slidably mounted upon the spring members and adapted to engage the bowed portions thereof to bring the widened end portions together.

In testimony whereof I affix my signature.

ARCHIE J. GIBSON.